US012095193B2

(12) United States Patent
Henry et al.

(10) Patent No.: US 12,095,193 B2
(45) Date of Patent: Sep. 17, 2024

(54) PLUG CONNECTOR

(71) Applicants: TE Connectivity Services GmbH, Schaffhausen (CH); Tyco Electronics (Shanghai) Co., Ltd., Shanghai (CN)

(72) Inventors: Randall Robert Henry, Lebanon, PA (US); Brandon Michael Matthews, McAlisterville, PA (US); Xinjie Zhang, Jiangsu (CN)

(73) Assignee: TE CONNECTIVITY SOLUTIONS GmbH et al., Schaffhausen (CH)

( * ) Notice: Subject to any disclaimer, the term of this patent is extended or adjusted under 35 U.S.C. 154(b) by 199 days.

(21) Appl. No.: 17/584,457

(22) Filed: Jan. 26, 2022

(65) Prior Publication Data

US 2023/0238728 A1 Jul. 27, 2023

(51) Int. Cl.

| | |
|---|---|
| ***H01R 13/26*** | (2006.01) |
| ***H01R 13/405*** | (2006.01) |
| ***H01R 13/502*** | (2006.01) |
| *H01R 4/02* | (2006.01) |
| *H01R 24/60* | (2011.01) |
| *H01R 107/00* | (2006.01) |

(52) U.S. Cl.

CPC ........... *H01R 13/26* (2013.01); *H01R 13/405* (2013.01); *H01R 13/502* (2013.01); *H01R 4/023* (2013.01); *H01R 24/60* (2013.01); *H01R 2107/00* (2013.01)

(58) Field of Classification Search

CPC .... H01R 13/26; H01R 13/405; H01R 13/502; H01R 4/023; H01R 24/60; H01R 2107/00

USPC .......................................................... 439/676

See application file for complete search history.

(56) References Cited

U.S. PATENT DOCUMENTS

| | | | | |
|---|---|---|---|---|
| 4,431,241 A * | 2/1984 | Hazelhurst | H01R 24/28 439/138 |
| 4,504,102 A * | 3/1985 | Wakuluk | H01R 12/675 439/43 |
| 5,011,436 A * | 4/1991 | Waters | H01R 13/6453 439/78 |
| 5,080,603 A * | 1/1992 | Mouissie | H01R 13/6273 439/353 |
| 5,527,190 A * | 6/1996 | Weingartner | H01R 24/58 439/669 |
| 5,911,595 A * | 6/1999 | Orr, Jr. | H01R 13/58 439/471 |
| 9,368,902 B2 * | 6/2016 | Nakai | H01R 13/5202 |
| 9,391,396 B1 * | 7/2016 | Yi | H01R 13/639 |
| 10,224,652 B2 * | 3/2019 | Herring | H01R 12/737 |
| 10,454,194 B1 * | 10/2019 | Phillips | H05K 1/117 |

(Continued)

*Primary Examiner* — Alexander Gilman

(57) ABSTRACT

A plug connector includes a plug housing including a mating end and a cable end. The cable end is oriented perpendicular to the mating end. The plug housing includes a mating chamber at the mating end and a cable chamber at the cable end. The plug connector includes a contact assembly coupled to the plug housing. The contact assembly includes an array of contacts. Each contact includes a mating end and a terminating end. Each contact is a right angle contact having the terminating end being perpendicular to the mating end. The plug connector includes cables terminated to the terminating ends of the contacts. Ends of the cables extend into the cable end of the plug housing. The cables extend from the plug housing at the cable end. The cables extend along linear cable axes from the contacts to the exterior of the plug housing.

19 Claims, 4 Drawing Sheets

(56) References Cited

U.S. PATENT DOCUMENTS

| | | | | |
|---|---|---|---|---|
| 10,680,363 | B2 * | 6/2020 | Phillips | H01R 12/52 |
| 10,855,028 | B1 * | 12/2020 | Henry | H01R 13/6272 |
| 2011/0151708 | A1 * | 6/2011 | Kaneko | H01R 12/714<br>439/660 |
| 2014/0377971 | A1 * | 12/2014 | Mathews | H01R 13/633<br>439/153 |
| 2015/0229067 | A1 * | 8/2015 | Nakai | H01R 13/405<br>439/587 |
| 2015/0311602 | A1 * | 10/2015 | Duesterhoeft | H01R 4/48185<br>439/817 |
| 2017/0264025 | A1 * | 9/2017 | Lappöhn | H01R 13/506 |
| 2018/0034178 | A1 * | 2/2018 | Tyler | H01R 13/62977 |
| 2019/0237912 | A1 * | 8/2019 | Little | H01R 13/6581 |
| 2020/0244010 | A1 * | 7/2020 | Chua | H01R 12/75 |
| 2020/0321727 | A1 * | 10/2020 | Li | H01R 13/6275 |
| 2021/0066857 | A1 * | 3/2021 | Gilkey | H01R 12/57 |
| 2021/0075143 | A1 * | 3/2021 | Laurx | H01R 13/6594 |
| 2021/0336368 | A1 * | 10/2021 | Iga | H01R 12/75 |

* cited by examiner

PLUG CONNECTOR

CROSS REFERENCE TO RELATED APPLICATIONS

This application claims benefit to Chinese Application No. 202210083391.2, filed 24 Jan. 2022, the subject matter of which is herein incorporated by reference in its entirety.

BACKGROUND OF THE INVENTION

The subject matter herein relates generally to plug connectors.

Electrical connectors are used to electrically connect various components within a communication system. Some systems use receptacle connectors, which may be mounted to a circuit board, and plug connectors, which may be provided at ends of cables. Some known receptacle connectors include card slots that receive paddle cards of the plug connectors. Conductors from cables are terminated to the paddle cards and extend from the paddle cards to another component. The cables of some known plug connectors may be bent 90° to extend away from the plug connector. However, due to minimum bending radius requirements for the cables, the bend in the cable requires significant space to accomplish the 90° transition. Thus, the plug connector occupies a large space, which restricts how close other components may be positioned relative to the receptacle connector and the plug connector.

A need remains for a plug connector having a short profile.

BRIEF DESCRIPTION OF THE INVENTION

In one embodiment, a plug connector is provided and includes a plug housing including a mating end and a cable end. The cable end is oriented perpendicular to the mating end. The plug housing includes a mating chamber at the mating end and a cable chamber at the cable end. The plug connector includes a contact assembly coupled to the plug housing. The contact assembly includes an array of contacts. Each contact includes a mating end and a terminating end. Each contact is a right angle contact having the terminating end being perpendicular to the mating end. The plug connector includes cables terminated to the terminating ends of the contacts. Ends of the cables extend into the cable end of the plug housing. The cables extend from the plug housing at the cable end. The cables extend along linear cable axes from the contacts to the exterior of the plug housing.

In another embodiment, a plug connector is provided and includes a plug housing including a mating end and a cable end. The cable end is oriented perpendicular to the mating end. The plug housing includes a mating chamber at the mating end and a cable chamber at the cable end. The plug housing includes a plug nose in the mating chamber configured to be plugged into a mating slot of a receptacle connector. The plug nose includes an upper surface and a lower surface. The plug connector includes a contact assembly coupled to the plug housing. The contact assembly includes an upper contact array of upper contacts and a lower contact array of lower contacts. Each upper contact includes an upper mating end and an upper terminating end. The upper contact is a right angle contact having the upper terminating end being perpendicular to the upper mating end. The upper mating ends of the upper contacts extend along the upper surface of the plug nose for mating with the receptacle connector. Each lower contact includes a lower mating end and a lower terminating end. The lower contact is a right angle contact having the lower terminating end being perpendicular to the lower mating end. The lower mating ends of the lower contacts extend along the lower surface of the plug nose for mating with the receptacle connector. The plug connector includes upper cables terminated to the upper terminating ends of the upper contacts. Ends of the upper cables extend into the cable end of the plug housing. The plug connector includes lower cables terminated to the lower terminating ends of the lower contacts. Ends of the lower cables extend into the cable end of the plug housing.

In a further embodiment, a plug connector is provided and includes a plug housing including a mating end and a cable end. The cable end is oriented perpendicular to the mating end. The plug housing includes a mating chamber at the mating end and a cable chamber at the cable end. The plug housing includes a plug nose in the mating chamber configured to be plugged into a mating slot of a receptacle connector. The plug nose includes an upper surface and a lower surface. The upper surface having upper contact channels. The lower surface having lower contact channels. The plug connector includes a contact assembly coupled to the plug housing. The contact assembly includes an upper contact array of upper contacts and a lower contact array of lower contacts. Each upper contact includes an upper mating end and an upper terminating end. The upper contact is a right angle contact having the upper terminating end being perpendicular to the upper mating end. The upper mating ends of the upper contacts are received in corresponding upper contact channels and extend along the upper surface of the plug nose for mating with the receptacle connector. The upper mating ends is preloaded against the plug nose. Each lower contact includes a lower mating end and a lower terminating end. The lower contact is a right angle contact having the lower terminating end being perpendicular to the lower mating end. The lower mating ends of the lower contacts are received in corresponding lower contact channels and extend along the lower surface of the plug nose for mating with the receptacle connector. The lower mating ends is preloaded against the plug nose. The plug connector includes upper cables terminated to the upper terminating ends of the upper contacts. Ends of the upper cables extend into the cable end of the plug housing. The plug connector includes lower cables terminated to the lower terminating ends of the lower contacts. Ends of the lower cables extend into the cable end of the plug housing.

DETAILED DESCRIPTION OF THE INVENTION

Figure 1:
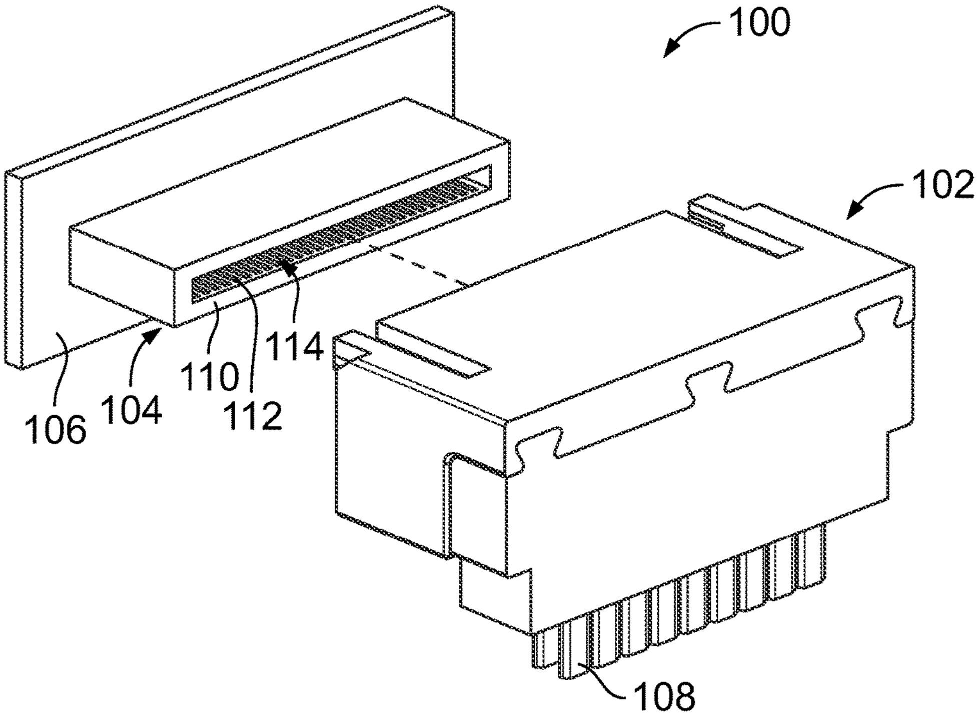
FIG. 1 illustrates an electrical connector system in accordance with an exemplary embodiment.

FIG. 1 illustrates an electrical connector system 100 in accordance with an exemplary embodiment. The electrical connector system 100 includes a plug connector 102 and a receptacle connector 104 that receives the plug connector 102. In the illustrated embodiment, the receptacle connector 104 is mounted to a circuit board 106. However, in alternative embodiments, the receptacle connector 104 may be a cable connector. In an exemplary embodiment, the plug connector 102 is a cable connector having a plurality of cables 108 exiting the plug connector 102. In an exemplary embodiment, the plug connector 102 is a right angle connector having the cables 108 exiting the plug connector 102 in a direction perpendicular to the mating direction with the receptacle connector 104.

The receptacle connector 104 includes a receptacle connector housing 110 holding a plurality of receptacle connector contacts 112. In an exemplary embodiment, the receptacle connector housing 110 includes a slot 114 at a mating end of the receptacle connector housing 110 that receives the plug connector 102. The receptacle connector contacts 112 are arranged within the slot 114 for mating with the plug connector 102. The slot 114 may be a card slot. The slot 114 is elongated, such as being rectangular shaped. The receptacle connector contacts 112 are located along the top and the bottom of the slot 114 in an exemplary embodiment. In various embodiments, the receptacle connector contacts 112 are deflectable contacts having spring beams configured to be mated with the plug connector 102 when the plug connector 102 is plugged into the slot 114. Other types of contacts may be provided in alternative embodiments.

Figure 2:
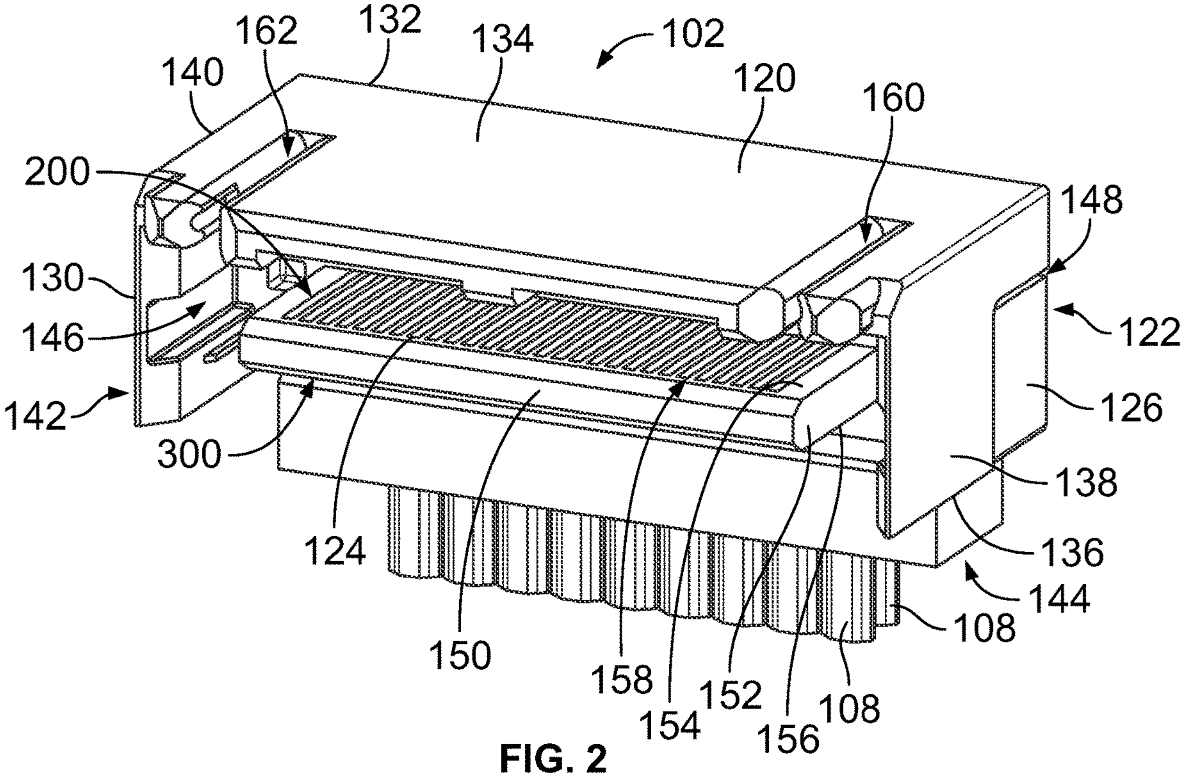
FIG. 2 is a front perspective view of the plug connector in accordance with an exemplary embodiment.

FIG. 2 is a front perspective view of the plug connector 102 in accordance with an exemplary embodiment. The plug connector 102 includes a plug housing 120 holding a contact assembly 122. The contact assembly 122 includes an array of contacts 124 configured to be electrically connected to the receptacle connector contacts 112 (shown in FIG. 1). The cables 108 are terminated to corresponding contacts 124. In an exemplary embodiment, the contact assembly 122 includes an upper module 200 and a lower module 300. The upper module 200 includes corresponding upper contacts and upper cables and the lower module 300 includes corresponding lower contacts and lower cables. The upper module 200 is positioned in an upper portion of the plug housing 120 and the lower module 300 is positioned in a lower portion of the plug housing 120. Utilizing the upper and lower modules 200, 300 increases contact density within the plug connector 102 compared to the plug connector 102 including a single set of contacts and cables.

In an exemplary embodiment, the contacts 124 are formed by one or more leadframes (for example, one leadframe for the upper module 200 and one leadframe for the lower module 300). In various embodiments, the contacts 124 are stamped and formed contacts (for example, all contacts within the leadframe stamped during a single stamping process and then formed to have a particular shape, such as including one or more bends). In an exemplary embodiment, the contacts 124 are right angle contacts having right angle bends. The right angle contacts allow the cables 108 to extend from the plug housing 120 in a direction perpendicular to the mating direction with the receptacle connector 104 without the cables needing to be bent. The cables 108 extend straight from the right angle contacts 124 to the exterior of the plug housing 120. The cables 108 are not bent 90° within the plug housing 120. As such, the plug housing 120 may be made relatively smaller, thus having a low-profile, compared to plug connectors that accommodate 90° cable bends within the plug housing. In an exemplary embodiment, the contacts 124 may be arranged in multiple rows, such as an upper row and a lower row. In an exemplary embodiment, the cables 108 may be arranged in multiple rows, such as a front row and a rear row, corresponding to the multiple rows of contacts 124.

The plug housing 120 extends between a front 130 and a rear 132. The plug housing 120 has a top 134 and a bottom 136. The plug housing 120 has a first side 138 and a second side 140. In the illustrated embodiment, the front 130 defines a mating end 142 of the plug housing 120 and the bottom 136 defines a cable end 144 of the plug housing 120. The cable end 144 is generally perpendicular to the mating end 142. The cables 108 extend into the plug housing 120 at the cable end 144. The mating end 142 is configured to be mated with the receptacle connector 104.

In an exemplary embodiment, the plug housing 120 includes a mating chamber 146 at the mating end 142. The contacts 124 of the contact assembly 122 extend into the mating chamber 146 for mating with the receptacle connector 104. The mating chamber 146 may be open at the front 130 for mating with the receptacle connector 104.

In an exemplary embodiment, the plug housing 120 includes a cable chamber 148 at the cable end 144. The cables 108 extend into the cable chamber 148. The contact assembly 122 is received in the cable chamber 148 for termination to the cables 108. The cable chamber 148 may be open at the bottom 136 to receive the cables 108. The cable chamber 148 may be open at the rear 132 to receive the contact assembly 122. For example, during assembly, the contact assembly 122 is loaded into the cable chamber 148 through the rear 132 and a portion of the contact assembly 122 and the cables 108 extend from the bottom 136. In an exemplary embodiment, the contact assembly 122 includes a contact assembly holder 126 holding the contacts 124 and/or the cables 108. The contact assembly holder 126 holds the contacts 124 and cables 108 of the upper module 200 and the contacts 124 and cables 108 of the lower module 300. The contact assembly holder 126 may be loaded into the plug housing 120, such as into the cable chamber 148. The contact assembly holder 126 holds relative positions of the contacts 124 and the cables 108 to allow loading of all of the contacts 124 and the cables 108 into the plug housing 120 as a single unit. However, the contacts 124 and/or the cables 108 may be loaded into the plug housing 120 individually rather than as a unit in alternative embodiments.

In an exemplary embodiment, the plug housing 120 includes a plug nose 150 in the mating chamber 146. The plug nose 150 is configured to be plugged into the slot 114 of the receptacle connector 104 (shown in FIG. 1). In an exemplary embodiment, the plug nose 150 includes an elongated tray 152 used to support the contacts 124. The plug nose 150 includes an upper surface 154 and a lower surface 156. In an exemplary embodiment, the contacts 124 of the upper module 200 extend along the upper surface 154 and the contacts 124 of the lower module 300 extend along the lower surface 156 for mating with the receptacle connector contacts 112 (shown in FIG. 1). In an exemplary embodiment, the plug nose 150 includes pockets 158 along the upper surface 154 and the lower surface 156 that receive the contacts 124. As such, the contacts 124 may be generally flush with the upper surface 154 and the lower surface 156.

In various embodiments, the plug nose 150 is integral with the plug housing 120. For example, the plug nose 150 is co-molded with the plug housing 120. In other various embodiments, the plug nose 150 may be formed separate and discrete from the plug housing 120 and coupled to the plug housing 120. For example, the plug nose 150 may be preassembled with the contact assembly 122 and loaded into the plug housing 120 with the contact assembly 122

The plug connector 102 includes one or more guide features 160 to guide mating with the receptacle connector 104. For example, the guide features 160 may include slots 162 that receive a portion of the receptacle connector 104 to position the plug connector 102 relative to the receptacle connector 104 during mating. Other types of guide features may be used in alternative embodiments, such as rails, tabs, pins, and the like. In an exemplary embodiment, the plug connector 102 may include a securing feature, such as a latch (not shown), for latchably securing the plug connector 102 to the receptacle connector 104

Figure 3:
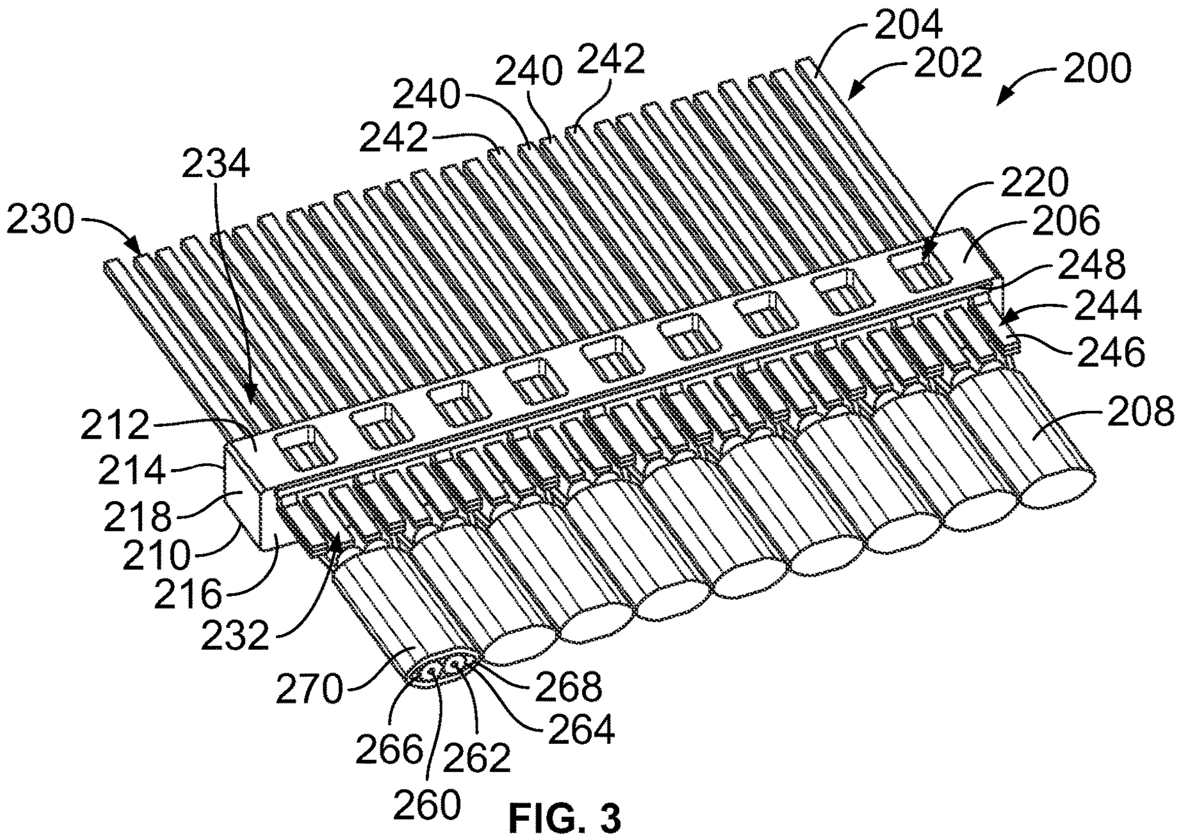
FIG. 3 is a rear perspective view of a portion of the contact assembly showing the upper module in accordance with an exemplary embodiment.
Figure 4:
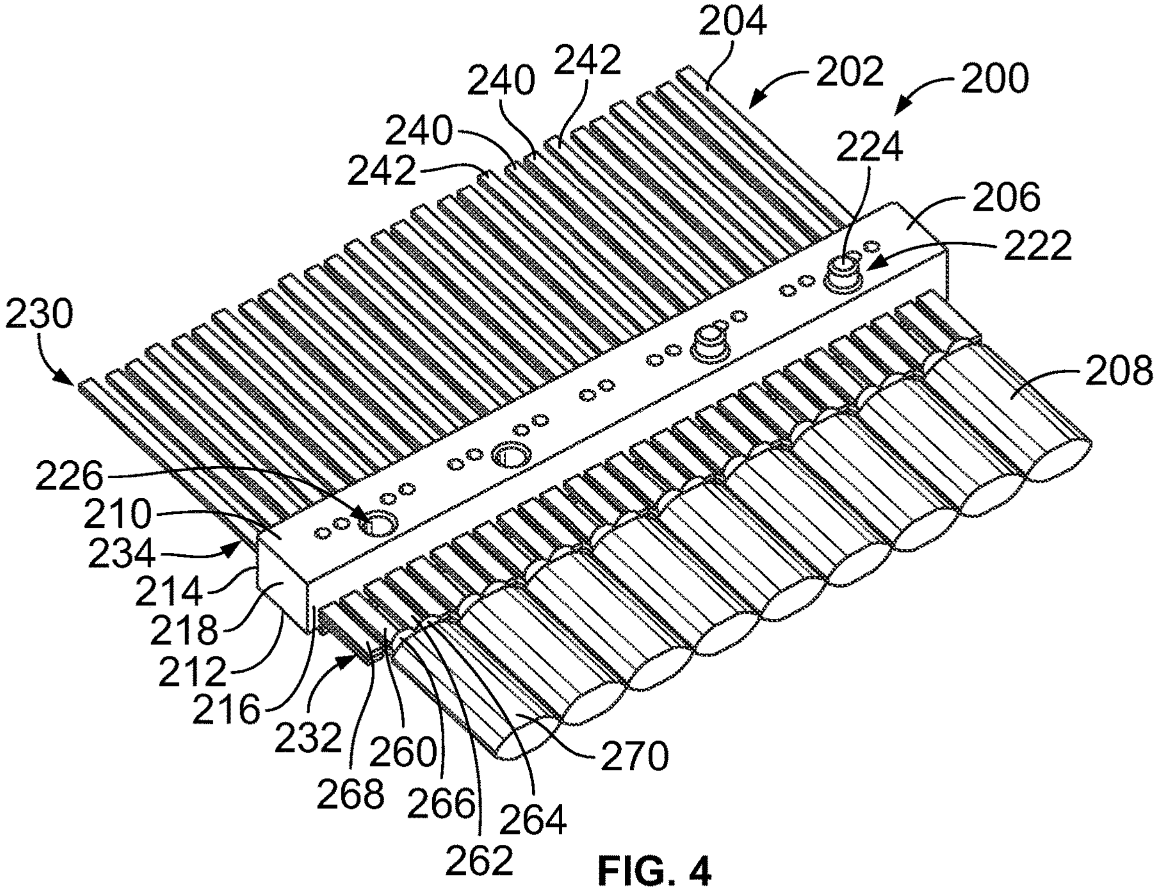
FIG. 4 is a front perspective view of a portion of the contact assembly showing the upper module in accordance with an exemplary embodiment.

FIG. 3 is a rear perspective view of a portion of the contact assembly 122 showing the upper module 200 in accordance with an exemplary embodiment. FIG. 4 is a front perspective view of a portion of the contact assembly 122 showing the upper module 200 in accordance with an exemplary embodiment. In an exemplary embodiment, the upper module 200 may be similar to the lower module 300 (shown in FIG. 5); however only the upper module 200 is shown in FIGS. 3 and 4 and described in detail. The lower module 300 may include similar components. However, dimensions of the lower module may differ from the upper module 200.

The upper module 200 includes an upper contact array 202 of upper contacts 204. The upper module 200 includes an upper contact holder 206 holding the upper contacts 204. The upper module 200 includes upper cables 208 terminated to the upper contacts 204. In an exemplary embodiment, the upper contact array 202 is formed from a stamped lead frame. For example, all of the upper contacts 204 may be stamped from a common sheet of metal material.

The upper contact holder 206 is manufactured from a dielectric material. In an exemplary embodiment, the upper contact holder 206 is overmolded around the upper contacts 204 to hold relative positions of the upper contacts 204. In the illustrated embodiment, the upper contact holder 206 is generally box shaped having a front 210, a rear 212, a top 214, a bottom 216, and opposite sides 218. In an exemplary embodiment, the upper contact holder 206 includes impedance windows 220 at the rear 212 to expose portions of the upper contacts 204 for impedance control. In an exemplary embodiment, the upper contact holder 206 includes securing features 222 at the front 210 used to secure the upper contact holder 206 to the lower module 300 (shown in FIG. 5). The securing features 222 include posts 224 and openings 226 in the illustrated embodiment. Other types of securing features may be used in alternative embodiments.

In an exemplary embodiment, the upper contacts 204 are flat and extend along the linear, parallel paths when initially stamped. The upper contacts 204 may be bent into a right-angle configuration at a later assembly step, such as after the upper contact holder 206 is coupled to the upper contacts 204. Each upper contact 204 includes a mating end 230 and a terminating end 232. A transition portion 234 is provided between the mating end 230 and the terminating end 232. The upper contact 204 is configured to be bent at the transition portion 234. The mating end 230 is configured to be mated with the receptacle connector contacts 112 (shown in FIG. 1). In various embodiments, the mating end 230 includes a mating pad defining a mating interface for the upper contact 204. The mating pad may be planar and flat for mating with the receptacle connector contact 112. The mating pad is configured to extend along the plug nose 150 (shown in FIG. 2) for connection to the receptacle connector contact 112. The upper cables 208 are configured to be terminated to the terminating ends 232. For example, the upper cables 208 may be soldered to the terminating ends 232. In various embodiments, the terminating end 232 includes a solder pad. The solder pad is generally planar and forms a surface to receive a portion of the upper cables 208 and soldered to create an electrical connection between the upper cable 208 and the upper contact 204.

In an exemplary embodiment, the upper contacts 204 include signal contacts 240 and ground contacts 242. The ground contacts 242 provide electrical shielding for the signal contacts 240. In an exemplary embodiment, the signal contacts 240 are arranged in pairs and the ground contacts 242 are arranged between the pairs of signal contacts 240. The pairs of signal contacts 240 may carry differential signals. In an exemplary embodiment, the ground contacts 242 are slightly longer than the signal contacts 240 such that the ground contacts 240 to mate first and unmate last relative to the signal contacts 240. In an exemplary embodiment, the upper module 200 includes an upper ground bus 244 electrically connected to the ground contacts 242. The upper ground bus 244 electrically commons all of the ground contacts 242. The upper ground bus 244 includes ground fingers 246 electrically connected to corresponding ground contacts 242 and a connecting bar 248 extending between the ground fingers 246. The ground fingers 246 may be soldered or welded to the terminating ends 232 of the ground contacts 242.

In an exemplary embodiment, each upper cable 204 is a twin-axial cable. The upper cable 204 includes a first conductor 260 and a second conductor 262. The conductors 260, 262 are configured to be electrically connected to corresponding signal contacts 240. For example, the conductors 260, 262 may be soldered or welded to the terminating ends 232 of the signal contacts 240. One or more insulators 264 surround the conductors 260, 262. In an exemplary embodiment, the upper cable 204 includes a cable shield 266 provide electrical shielding for the conductors 260, 262. In various embodiments, the upper cable 204 includes one or more drain wires 268 electrically connected to the cable shield 266. The drain wires 268 are configured to be electrically connected to the ground contacts 242. For example, the drain wires 268 may be soldered or welded to the terminating ends 232 of the ground contacts 242. In alternative embodiments, the cable shield 266 may be electrically connected to the ground contacts 242 and/or the upper ground bus 244, such as by a direct electrical connection to the cable shield 266. A cable jacket 270 is provided at the exterior of the upper cable 204.

Figure 5:
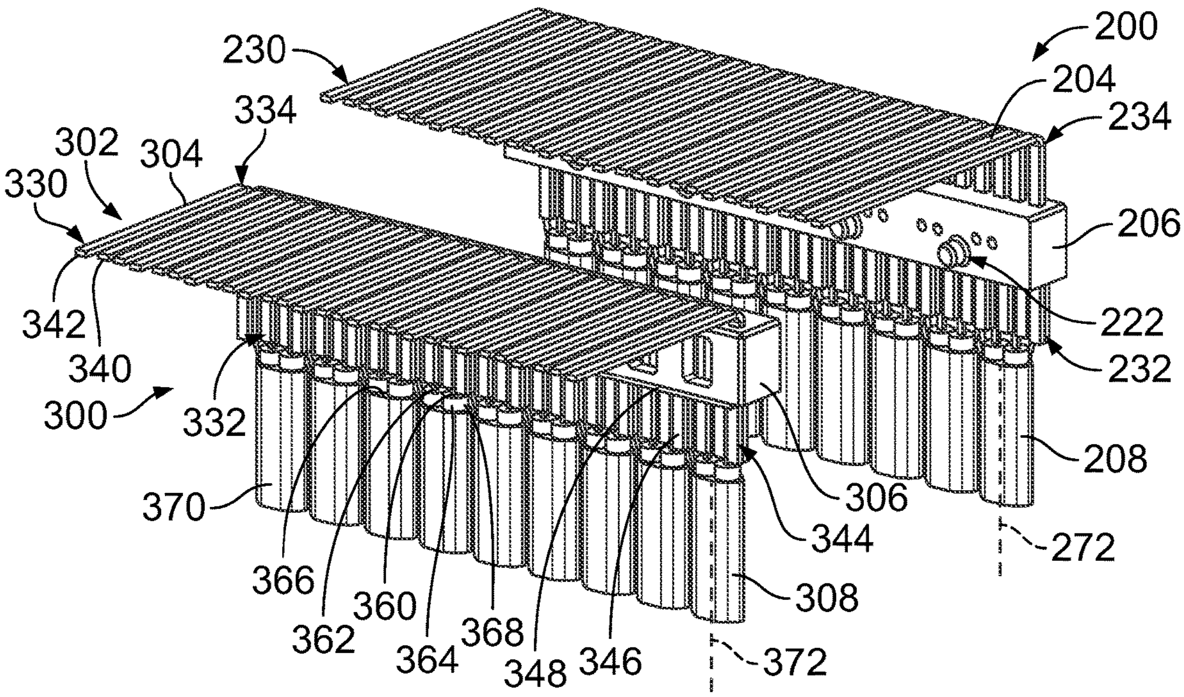
FIG. 5 is a perspective view of the contact assembly in accordance with an exemplary embodiment.

FIG. 5 is a perspective view of the contact assembly 122 in accordance with an exemplary embodiment. FIG. 5 illustrates the upper module 200 and the lower module 300. The upper module 200 is configured to be coupled to the lower module 300 to form the contact assembly 122.

The lower module 300 includes a lower contact array 302 of lower contacts 304. The lower module 300 includes a lower contact holder 306 holding the lower contacts 304. The lower module 300 includes lower cables 308 terminated to the lower contacts 304. In an exemplary embodiment, the lower contact array 302 is formed from a stamped leadframe, which may be different from the stamped leadframe of the upper module 200. For example, all of the lower contacts 304 may be stamped from a common sheet of metal material.

The lower contact holder 306 is manufactured from a dielectric material. In an exemplary embodiment, the lower contact holder 306 is overmolded around the lower contacts 304 to hold relative positions of the lower contacts 304. The lower contact holder 306 is configured to be coupled to the upper contact holder 206, such as using the securing features 222 and complimentary securing features on the lower contact holder 306. The securing features may be connected by an interference fit.

In an exemplary embodiment, the lower contacts 304 include signal contacts 340 and ground contacts 342. Each lower contact 304 includes a mating end 330 and a terminating end 332. A transition portion 334 is provided between the mating end 330 and the terminating end 332. The lower contacts 304 are bent into a right angle configuration at the transition portion 334 such that the lower mating end 330 is perpendicular to the lower terminating end 332. The lower cables 308 are terminated to the terminating ends 332.

In an exemplary embodiment, the lower module 300 includes a lower ground bus 344 electrically connected to the ground contacts 342. The lower ground bus 344 electrically commons all of the ground contacts 342. The lower ground bus 344 includes ground fingers 346 electrically connected to corresponding ground contacts 342 and a connecting bar 348 extending between the ground fingers 346. The ground fingers 346 may be soldered or welded to the terminating ends 332 of the ground contacts 342.

In an exemplary embodiment, each lower cable 304 is a twin-axial cable. The lower cable 304 includes a first conductor 360 and a second conductor 362. The conductors 360, 362 are configured to be electrically connected to corresponding signal contacts 340. For example, the conductors 360, 362 may be soldered or welded to the terminating ends 332 of the signal contacts 340. One or more insulators 364 surround the conductors 360, 362. In an exemplary embodiment, the lower cable 304 includes a cable shield 366 provide electrical shielding for the conductors 360, 362. In various embodiments, the lower cable 304 includes one or more drain wires 368 electrically connected to the cable shield 366. A cable jacket 370 is provided at the exterior of the lower cable 304.

When assembled, the upper module 200 is coupled to the lower module 300. The contact holders 206, 306 hold the relative positions of the contacts 204, 304. The upper contacts 204 are located in an upper row and the lower contacts 304 are located in a lower row. The upper mating ends 230 of the upper contacts 204 are located above the lower mating ends 330 of the lower contacts 304. The upper terminating ends 232 of the upper contacts 204 are located rearward of the lower terminating ends 332 of the lower contacts 304. The upper cables 208 are located rearward of the lower cables 308. The upper cables 208 extend along linear cable axes 272. The lower cables 308 extend along linear cable axes 372. The upper cables 208 are arranged in a row with the linear cable axes 272 parallel to each other. The lower cables 208 are arranged in a row with the linear cable axes 372 parallel to each other and parallel to the upper cables 204. The upper and lower cables 208, 308 extend straight downward from the terminating ends 232, 332. The upper and lower cables 208, 308 do not have bends. Rather, the upper and lower contacts 204, 304 have 90° bends to transition between the mating end and the cable end of the contact assembly 122. As such, the front-to-rear dimension may be relatively short compared to contact assemblies having planar contacts with cables bent 90° to form the right angle transition. In various embodiments, use of the right-angle contacts to form the right angle transition (compared to use of the cables to form the right angle transition) may reduce the front-to-rear dimension by approximately half.

In an exemplary embodiment, the upper and lower transition portions 234, 334 include the right-angle bends to orient the mating ends 230, 330 generally perpendicular to the terminating ends 232, 332. In various embodiments, the upper and lower transition portions 234, 334 may be bent 90°. In other various embodiments, the upper and lower transition portions 234, 334 may be bent at other angles. For example, the upper and lower transition portions 234, 334 may be over-bent or under-bent to create an internal pre-load in the contacts 204, 304. In various embodiments, the upper transition portions 234 may be over-bent, such as to 95° such that the mating ends 230 are angled inward (for example, downward toward the lower contacts 304) to force the upper mating ends 230 to interfere with the plug nose 150 when coupled thereto. The over-bend causes the mating ends 230 to be deflected outward (for example, upward) when interfacing with the plug nose 150, which creates the internal pre-load force in the upper contact 204 and ensures that the mating end 230 remains seated against the plug nose 150, such as to prevent stubbing during mating with the receptacle connector 104. In various embodiments, the lower transition portions 334 may be under-bent, such as to 85° such that the mating ends 330 are angled inward (for example, upward toward the upper contacts 204) to force the lower mating ends 330 to interfere with the plug nose 150 when coupled thereto. The under-bend causes the mating ends 330 to be deflected outward (for example, downward) when interfacing with the plug nose 150, which creates the internal pre-load force in the lower contact 304 and ensures that the mating end 330 remains seated against the plug nose 150, such as to prevent stubbing during mating with the receptacle connector 104.

Figure 6:
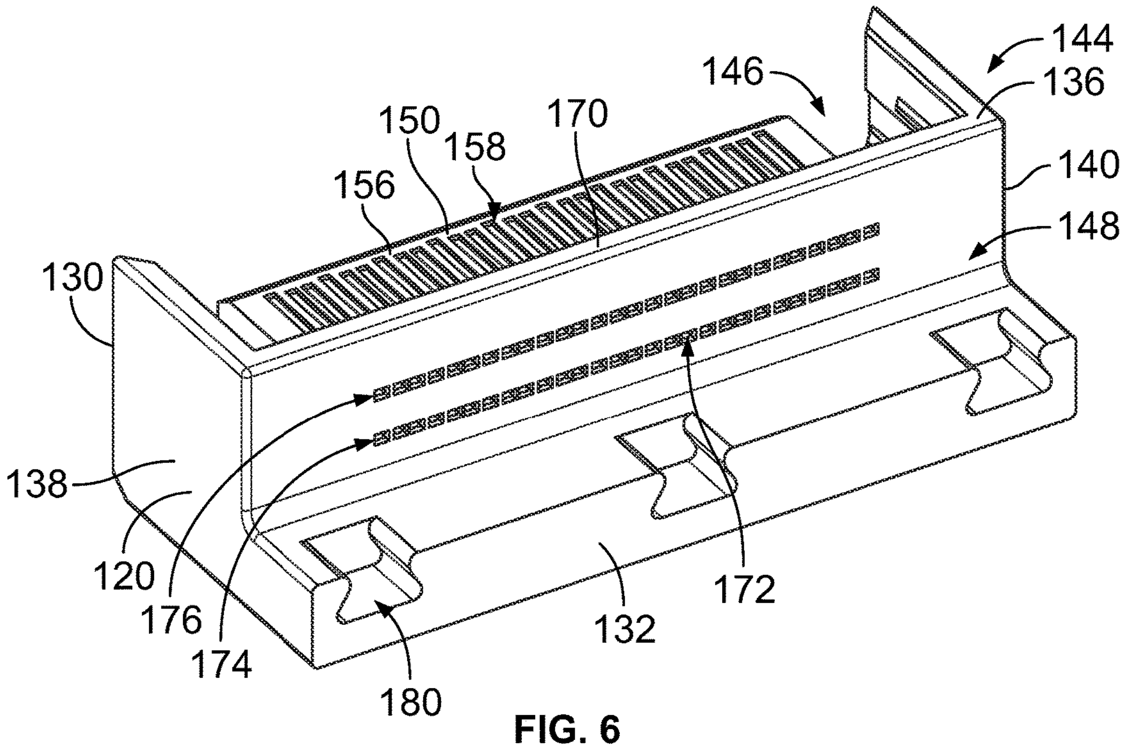
FIG. 6 is a rear, bottom perspective view of the plug housing in accordance with an exemplary embodiment.

FIG. 6 is a rear, bottom perspective view of the plug housing 120 in accordance with an exemplary embodiment. FIG. 6 illustrates the mating chamber 146 at the front 130 and the cable chamber 148 at the rear 132. The plug nose 150 extends into the mating chamber 146. FIG. 6 illustrates the pockets 158 along the lower surface 156 of the plug nose 150.

In an exemplary embodiment, the plug housing 120 includes a divider wall 170 between the mating chamber 146 and the cable chamber 148. In the illustrated embodiment, the divider wall 170 as a vertical orientation. The plug nose 150 extends forward of the divider wall 170 into the mating chamber 146. The divider wall 170 includes a plurality of contact channels 172 extending therethrough. The contact channels 172 are configured to receive the mating ends of the contacts 124 (shown in FIG. 2). The contacts 124 may be loaded into the contact channels 172 from behind the divider wall 170, such as from the cable chamber 148. In the illustrated embodiment, the contact channels 172 are arranged in an upper row 174 and a lower row 176. The upper row 174 is aligned with the upper surface 154 of the plug nose 150 and the lower row 176 is aligned with the lower surface 156 of the plug nose 150. The contacts 124 pass through the divider wall 170 directly into the pockets 158.

In an exemplary embodiment, the cable chamber 148 is open at the rear 132 to receive the contact assembly 122. For example, the contact assembly 122 may be rear loaded into the cable chamber 148. In an exemplary embodiment, the cable chamber 148 is open at the bottom 136 to allow the contact assembly 122 and/or the cables 108 to extend from the cable end 144 of the plug housing 120. Optionally, the cable chamber 148 may be open at the sides 138, 140. The plug housing 120 includes securing features 180 for securing the contact assembly 122 in the cable chamber 148. In the illustrated embodiment, the securing features 180 are pockets formed in the upper wall of the plug housing 120. The pockets may be dovetailed pockets in various embodiments. Other types of securing features may be used in alternative embodiments.

Figure 7:
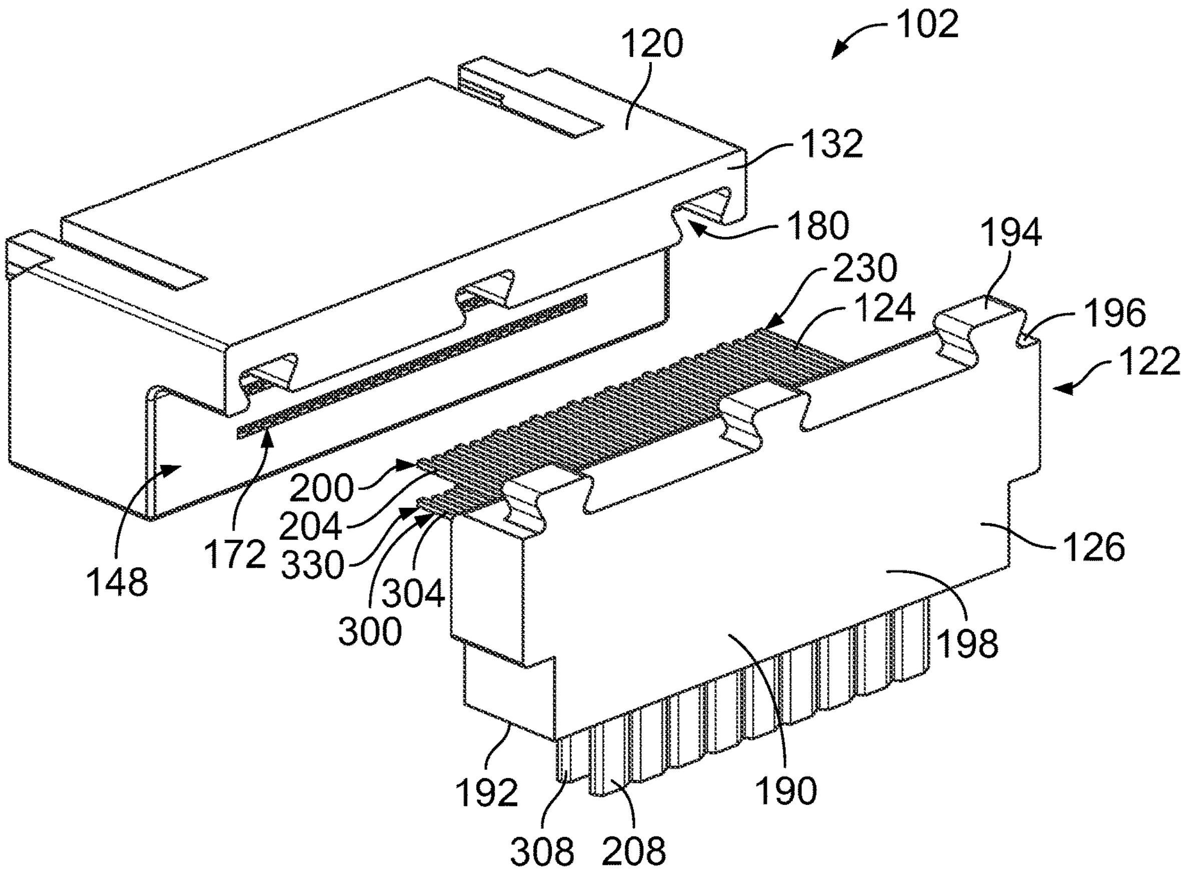
FIG. 7 is a rear perspective view of the plug connector in accordance with an exemplary embodiment.

FIG. 7 is a rear perspective view of the plug connector 102 in accordance with an exemplary embodiment. FIG. 7 illustrates the contact assembly 122 poised for coupling with the plug housing 120. During assembly, the contact assembly 122 is located rearward of the plug housing 120 and is configured to be loaded into the cable chamber 148 from behind the plug housing 120. The mating ends of the contacts 124 are aligned with the contact channels 172. The contacts 124 may be loaded into the contact channels 172 has the contact assembly 122 is loaded into the cable chamber 148.

In an exemplary embodiment, the contact assembly 122 includes the contact assembly holder 126. The contact assembly holder 126 supports the upper module 200 and the lower module 300. The contact assembly holder 126 supports the upper contacts 204 and the lower contacts 304. The contact assembly holder 126 supports the upper cables 208 and the lower cables 308.

In an exemplary embodiment, the contact assembly holder 126 includes an overmold body 190 formed in place around the contacts 204, 304 and the cables 208, 308. For example, the overmold body 190 may be overmolded over the contacts 204, 304, the contact holders 206, 306 (shown in FIG. 5), and the cables 208, 308. The overmold body 190 provides strain relief for the cables 208, 308. The cables 208, 308 extend vertically downward from a bottom 192 of the overmold body 190. In an exemplary embodiment, the overmold body 190 supports the mating ends 230 of the upper contacts 204 relative to the mating ends 330 of the lower contacts 304. The contacts 204, 304 extend forward of the overmold body 190, such as for loading into the contact channels 172.

In various embodiments, the plug nose 150 may extend from the front of the overmold body 190. For example, the contacts 204, 304 may be preloaded onto the plug nose 150 prior to loading the contact assembly 122, with the plug nose 150, into the plug housing 120. In such embodiments, the plug nose 150 may be a separate component from the overmold body 190. Alternatively, the plug nose 150 may be integral with the overmold body 190, such as being comolded with the overmold body 190.

In an exemplary embodiment, the contact assembly holder 126 includes securing features 194 for securing the contact assembly 122 to the plug housing 120. In the illustrated embodiment, the securing features 194 are protrusions extending from a top 196 of the overmold body 190. The protrusions may be dovetailed shaped in various embodiments. The securing features 194 interface with the securing features 180 to mechanically fix the contact assembly 122 relative to the plug housing 120. Other types of securing features may be used in alternative embodiments.

In an exemplary embodiment, when assembled, a rear 198 of the overmold body 190 may be co-planer with the rear 132 of the plug housing 120. The contacts 204, 304 and the cables 208, 308 are both contained forward of the rear 198 of the overmold body 190. For example, the contacts 204, 304 transition between the mating end and the terminating end (for example, right angle bend) within the volume of the overmold body 190. The cables 208, 308 extend from the terminating ends of the contacts 204, 304 straight downward from the bottom 192. The plug connector 102 has a low-profile (for example, short overall width between the front and the rear of the plug connector 102). Other components may be located immediately rearward of the plug connector 102 because the cables 208, 308 extend downward from the bottom of the plug connector 102.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A plug connector comprising:

a plug housing including a mating end and a cable end, the cable end oriented perpendicular to the mating end, the plug housing including a mating chamber at the mating end and a cable chamber at the cable end;

a contact assembly coupled to the plug housing, the contact assembly including an array of contacts arranged in a first row of contacts and a second row of contacts, each contact including a mating end and a terminating end and a transition portion between the mating end and the terminating end, each contact being a right angle contact having the terminating end being perpendicular to the mating end with a 90° bend at the transition portion between the mating end and the terminating end, the mating end configured to be mated with a mating connector along a mating axis; and cables terminated to the terminating ends of the contacts, ends of the cables extending into the cable end of the plug housing, the cables extending from the plug housing at the cable end, the cables extending along linear cable axes from the contacts to the exterior of the plug housing, the cable axes being oriented perpendicular to the mating axis.

2. The plug connector of claim 1, wherein the cables are not bent inside the plug housing.

3. The plug connector of claim 1, wherein the linear cable axes are oriented perpendicular to the mating ends of the contacts.

4. The plug connector of claim 1, wherein the contacts are bent 90° in the cable chamber.

5. The plug connector of claim 1, wherein the plug housing includes a front and a rear, the plug housing including a top and a bottom, the mating end being open at the front for mating with a receptacle connector, the cable chamber being open at the bottom to receive the ends of the cables.

6. The plug connector of claim 1, wherein the contact assembly includes a contact assembly holder holding the contacts, the contact assembly holder being received in the cable chamber, the contact assembly holder being coupled to the plug housing.

7. The plug connector of claim 6, wherein the contact assembly holder includes an overmold body formed in place around the terminating ends of the contacts and around ends of the cables.

8. The plug connector of claim 1, wherein the plug housing includes a plug nose in the mating chamber configured to be plugged into a mating slot of a receptacle connector, the plug nose including an upper surface and a lower surface, the contacts including upper contacts and lower contacts, the mating ends of the upper contacts extending along the upper surface, the mating ends of the lower contacts extending along the lower surface.

9. The plug connector of claim 1, wherein the plug housing includes a divider wall between the mating chamber and the cable chamber, the dividing wall including contact channels, the mating ends of the contacts being loaded through the contact channels into the mating chamber.

10. The plug connector of claim 1, wherein the cables include cable conductors, the cable conductors being soldered to the terminating ends.

11. The plug connector of claim 1, wherein the contacts include signal contacts and ground contact, the signal contacts being arranged in pairs, the ground contacts being located between pairs of the signal contacts.

12. The plug connector of claim 11, wherein the contact assembly includes a ground bus electrically connected to the ground contacts to electrically common the ground contacts.

13. The plug connector of claim 1, wherein the contacts each include an internal preload force causing the mating end to engage the plug housing.

14. A plug connector comprising:

a plug housing including a mating end and a cable end, the cable end oriented perpendicular to the mating end, the plug housing including a mating chamber at the mating end and a cable chamber at the cable end, the plug housing including a plug nose in the mating chamber configured to be plugged into a mating slot of a receptacle connector, the plug nose including an upper surface and a lower surface;

a contact assembly coupled to the plug housing, the contact assembly including an upper contact array of upper contacts and a lower contact array of lower contacts, each upper contact including an upper mating end and an upper terminating end and an upper transition portion between the upper mating end and the upper terminating end, the upper transition portion including a 90° bend, the upper contact being a right angle contact having the upper terminating end being perpendicular to the upper mating end, wherein the upper mating ends of the upper contacts extend along the upper surface of the plug nose for mating with the receptacle connector, each lower contact including a lower mating end and a lower terminating end and a lower transition portion between the lower mating end and the lower terminating end, the lower transition portion including a 90° bend, the lower contact being a right angle contact having the lower terminating end being perpendicular to the lower mating end, wherein the lower mating ends of the lower contacts extend along the lower surface of the plug nose for mating with the receptacle connector;

upper cables terminated to the upper terminating ends of the upper contacts, ends of the upper cables extending into the cable end of the plug housing; and lower cables terminated to the lower terminating ends of the lower contacts, ends of the lower cables extending into the cable end of the plug housing.

15. The plug connector of claim 14, wherein the upper cables and the lower cables extend parallel to each other along linear cable axes within the plug housing.

16. The plug connector of claim 14, wherein the upper contacts are held together by an upper contact holder and the lower contacts are held together by a lower contact holder, the upper contact holder being coupled to the lower contact holder to position the upper contacts relative to the lower contacts, the contact assembly including an overmold body formed in place around the upper terminating ends and the ends of the upper cables and formed in place around the lower terminating ends and the ends of the lower cables.

17. A plug connector comprising:

a plug housing including a mating end and a cable end, the cable end oriented perpendicular to the mating end, the plug housing including a mating chamber at the mating end and a cable chamber at the cable end, the plug housing including a plug nose in the mating chamber configured to be plugged into a mating slot of a receptacle connector, the plug nose including an upper surface and a lower surface, the upper surface having upper contact channels, the lower surface having lower contact channels;

a contact assembly coupled to the plug housing, the contact assembly including an upper contact array of upper contacts and a lower contact array of lower contacts, each upper contact including an upper mating end and an upper terminating end and an upper transition portion between the upper mating end and the upper terminating end, the upper transition portion including a 90° bend, the upper contact being a right angle contact having the upper terminating end being perpendicular to the upper mating end, wherein the upper mating ends of the upper contacts are received in corresponding upper contact channels and extend along the upper surface of the plug nose for mating with the receptacle connector, the upper mating ends being preloaded against the plug nose, each lower contact including a lower mating end and a lower terminating end and a lower transition portion between the lower mating end and the lower terminating end, the lower transition portion including a 90° bend, the lower contact being a right angle contact having the lower terminating end being perpendicular to the lower mating end, wherein the lower mating ends of the lower contacts are received in corresponding lower contact channels and extend along the lower surface of the plug nose for mating with the receptacle connector, the lower mating ends being preloaded against the plug nose;

upper cables terminated to the upper terminating ends of the upper contacts, ends of the upper cables extending into the cable end of the plug housing; and lower cables terminated to the lower terminating ends of the lower contacts, ends of the lower cables extending into the cable end of the plug housing.

18. The plug connector of claim 17, wherein the upper cables and the lower cables extend parallel to each other along linear cable axes within the plug housing.

19. The plug connector of claim 17, wherein the upper contacts are held together by an upper contact holder and the lower contacts are held together by a lower contact holder, the upper contact holder being coupled to the lower contact holder to position the upper contacts relative to the lower contacts, the contact assembly including an overmold body formed in place around the upper terminating ends and the ends of the upper cables and formed in place around the lower terminating ends and the ends of the lower cables.

* * * * *